United States Patent [19]

Sharpless

[11] Patent Number: 4,824,295

[45] Date of Patent: Apr. 25, 1989

[54] POWDER DELIVERY SYSTEM

[75] Inventor: John Sharpless, Oberlin, Ohio

[73] Assignee: Nordson Corporation, Westlake, Ohio

[21] Appl. No.: 841,210

[22] Filed: Mar. 19, 1986

Related U.S. Application Data

[63] Continuation-in-part of Ser. No. 681,502, Dec. 13, 1984, abandoned.

[51] Int. Cl.4 .............................................. B65G 53/40

[52] U.S. Cl. .................................... 406/109; 406/123; 406/144; 406/153; 118/312; 118/634

[58] Field of Search ............... 406/106, 107, 109, 123, 406/138, 142, 174, 175, 144, 124, 151-153, 121, 171; 239/124, 302, 704, 693, 695; 118/634, 312, 326; 427/27, 345, 421

[56] References Cited

U.S. PATENT DOCUMENTS

| | | | |
|---|---|---|---|
| 1,629,032 | 5/1927 | Goodridge | 239/124 |
| 2,602,707 | 7/1952 | Garoutte | 406/138 |
| 3,733,011 | 5/1973 | Driscoll | 406/123 |
| 3,746,254 | 7/1973 | Duncan et al. . | |
| 3,791,341 | 2/1974 | Diamond et al. | 118/312 X |
| 3,847,118 | 11/1974 | Ambry | 118/634 X |
| 3,870,375 | 3/1975 | Duncan et al. | 406/138 X |
| 4,380,320 | 4/1983 | Hollstein et al. . | |
| 4,586,854 | 5/1986 | Newman et al. | 406/153 |

FOREIGN PATENT DOCUMENTS

| | | | |
|---|---|---|---|
| 1910487 | 9/1970 | Fed. Rep. of Germany | 118/312 |
| 1494061 | 7/1967 | France . | |
| 1521800 | 8/1978 | United Kingdom . | |
| WO87/05832 | 10/1987 | World Int. Prop. O. | 239/124 |

*Primary Examiner*—Sherman D. Basinger
*Assistant Examiner*—James M. Kannofsky
*Attorney, Agent, or Firm*—Wood, Herron & Evans

[57] ABSTRACT

A method and apparatus for pumping a steady flow of powder from a powder spray gun of a powder spray system by pumping the powder from a fluidized bed feed hopper to the spray gun via a small auxiliary fluidized bed hopper located in close proximity to the powder spray gun. The apparatus comprises a primary fluidized bed hopper into which reclaimed powder is supplied from a powder spray booth via a powder filter module and a sieve. Powder from the primary feed hopper is pumped to the gun via an auxiliary and much smaller capacity auxiliary fluidized bed hopper located in relative close proximity to the spray gun.

6 Claims, 1 Drawing Sheet

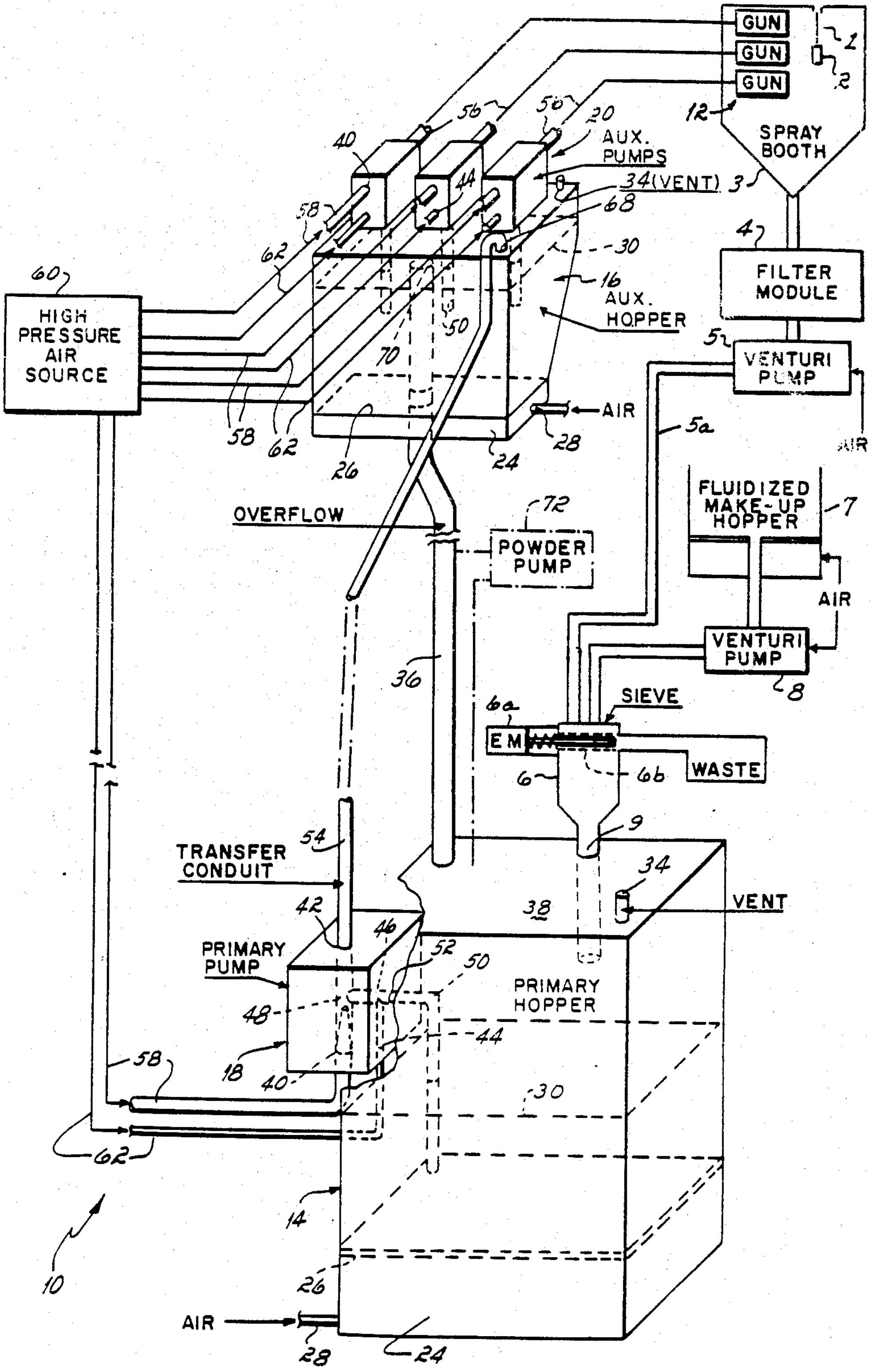
GUN
GUN
GUN
1
2
12
SPRAY BOOTH
3
4
FILTER MODULE
5
VENTURI PUMP
AIR
5a
40
56
56
20
AUX. PUMPS
44
34(VENT)
68
58
62
30
16
AUX. HOPPER
60
HIGH PRESSURE AIR SOURCE
50
70
AIR
28
58
62
26
24
OVERFLOW
72
POWDER PUMP
FLUIDIZED MAKE-UP HOPPER
7
AIR
VENTURI PUMP
8
36
6a
SIEVE
EM
WASTE
6
6b
9
TRANSFER CONDUIT
54
34
VENT
38
42
46
PRIMARY PUMP
52
50
PRIMARY HOPPER
48
44
18
40
58
30
62
14
10
26
AIR
28
24

POWDER DELIVERY SYSTEM

This application is a continuation in part application of application Ser. No. 681,502, filed Dec. 13, 1984, and assigned to the assignee of this application.

This invention relates to powder spray systems for spraying air entrained solid particulate powder material from powder spray guns onto workpieces within a powder spray booth. More particularly, this invention relates to an improved system for supplying an even flow of powder from a fluidized powder source to a powder spray gun or dispenser of such a powder spray system.

Characteristically, powder is supplied to a powder spray gun through a pneumatic conveyor line within which there is a powder pump containing a low pressure venturi pumping chamber. This chamber is intersected by a powder supply passage through which powder is supplied to the pump from a fluidized bed hopper. In order to meter or control the rate of flow of powder from the fluidized bed into the venturi pumping chamber, such pumps conventionally include a metering air flow passage operable to inject a controlled flow of air into the powder supply passage. The pressure of this metering air flow controls the amount of air which is mixed with the powder entering the pump, and consequently the rate of flow of powder from the pump.

One of the shortcomings of all powder spray systems, including systems incorporating powder pumps of the type described hereinabove, is that the powder ejected from the spray gun of the system commonly flows unevenly from the gun. There are periodic puffs or clouds of powder ejected from the gun and periodic reductions in the density of powder ejected from the gun. Such periodic increases or decreases in powder density sprayed from the gun result in uneven application of powder to a target substrate or workpiece to which the powder is applied. Consequently, such random changes in powder density are very undesirable.

There have been numerous attempts to minimize or reduce these random changes of powder density sprayed from a powder spray gun. Such attempts have taken the form of changes in the design of the powder spray gun, changes in the design and configuration of the powder pump, etc. Most of these changes have improved the situation somewhat, but have not cured the problem.

It has been an objective of this invention to provide an improved powder spray system wherein inadvertent or random changes in the flow rate of powder dispensed from a powder spray gun or dispenser of the system are minimized or eliminated.

This invention is in part predicated upon the discovery that one source of uneven flow of powder from a powder spray gun or dispenser of a powder spray system is the configuration of the system between the fluidized bed source of powder and the dispensing gun. That portion of the system has heretofore simply consisted of a siphon tube for supplying powder from the fluidized bed to a powder pump, the pump, and a long supply hose connecting the pump to the gun. It has therefore been an objective of this invention to eliminate powder flow variances which have heretofore been attributable to the configuration of this portion of the system.

These objectives are achieved, and this invention is predicated in part, upon the concept of supplying powder from the powder pump through a hose to an auxiliary fluidized bed of powder located near the dispensing gun, and then supplying the powder to the gun from the auxiliary fluidized bed through an auxiliary powder pump and a relatively short hose. By utilizing an auxiliary fluidized bed and an auxiliary powder pump located near the dispensing gun outlet of the system, erratic powder flow heretofore attributable to the relatively long length of hose between the pump and the gun and to a varying level of powder within the fluidized bed source of powder, have been reduced or completely eliminated.

I have found that a substantial portion of the flow variances within a conventional prior art powder spray system are attributable to two sources. These sources are the relatively long hose between the pump and the gun and the varying level of powder in the fluidized bed source of powder to the system. A long hose between the pump and the gun creates flow variances as a result of loops and curves which inevitably occur in such long hoses. Powder collects in these loops or curves and eventually restricts flow through the hose until a pressure build-up behind the powder restriction breaks the restriction away and causes a resulting puff of powder to be dispensed from the gun while simultaneously causing a pressure increase in the hose and a resulting increase in the flow of powder to the gun. Thereafter, the powder again begins to collect in the curve or loop of the hose from which it had just broken away until it forms a restriction in the hose, breaks free, causes another puff of powder, etc.

The other primary source of varying flow from a conventionally configurated prior art powder flow system, the varying level of powder contained in the fluidized bed source of powder, causes flow variances as a result of differing pressures being required to draw powder into the powder pump as the powder level changes in the fluidized bed. In fact though, the vacuum within the pump tending to draw powder into the pump does not change with the differing level of powder in the fluidized bed hopper. Instead, the vacuum pressure remains the same, but the quantity of powder drawn into the pump changes as the level of powder in the hopper changes.

According to the practice of this invention, the powder spray system comprises a primary fluidized bed hopper source of powder and a smaller capacity auxiliary fluidized bed hopper located adjacent or near the powder dispensing guns. A venturi style pump and a connecting hose transport powder from the primary hopper to the auxiliary hopper, and an auxiliary venturi style powder pump and connecting hose transport the powder from the auxiliary hopper to a dispensing gun. There is an overflow pipe which extends between the auxiliary hopper and the primary hopper and which functions to maintain a fixed level of powder in the auxiliary hopper.

The practice of this invention with its use of an auxiliary fluidized bed hopper and an auxiliary venturi pump located closely adjacent the powder spray gun of a powder spray system enables both of the above-identified sources of powder flow variances to be eliminated. Any flow variances which occur in the long hose between the primary hopper and the auxiliary hopper do not affect the flow rate between the auxiliary powder pump and the spray gun. Furthermore, the use of an overflow pipe between the auxiliary fluidized bed hopper and the primary fluidized bed hopper enables the level of powder in the auxiliary hopper to be maintained at a fixed level so long as an excess amount of powder is supplied to the auxiliary fluidized bed. Thereby, flow variances attributable to the changing level of powder in the supply hopper are eliminated.

These and other objects and advantages of this invention will be more readily apparent from the following description of the drawing in which:

The FIGURE is a schematic view of a powder spray system incorporating the auxiliary powder hopper and auxiliary powder pump of this invention.

Referring now to the FIGURE, there is illustrated a powder spray system 10 for dispensing solid particulate powder material from a plurality of spray guns 12. Three guns 12 are illustrated, but the system is equally applicable to the spraying of powder from a single gun or from a substantially greater number of guns 12. The guns 12 per se form no part of the invention of this application and are well known in the prior art. One such gun which is suitable for use in this application is illustrated and described in U.S. Pat. No. 4,380,320 of Thomas E. Hollstein, et al., for "Electrostatic Powder Spray Gun Nozzle," assigned to the assignee of this application.

The system 10 includes a conveyor (not shown) which carries hooks 1 suspended therefrom for conveying workpieces 2 through a powder spray booth 3. The booth is provided with powder spray guns 12 which direct electrostatically charged powder into the booth. The powder collects on the workpieces 2 which are oppositely charged from the electrostatic charge on the powder so that the powder will be attracted to the surfaces of the workpieces 2. Only a portion of the powder sprayed adheres to the workpieces 2. The remainder or oversprayed powder is suspended in the air of the booth and is drawn therefrom via ducts connected to the inlet of a filter module 4. This filter module may contain either conventional bag type filters or cartridge type filters operative to extract the powder from the air in which it is entrained when it flows from the booth into the filter module. Typical filter modules suitable for use in the practice of this invention are disclosed in U.S. Pat. Nos. 4,378,728 and 4,409,009, both of which are assigned to the assignee of this application.

The filter module 4 is operative to extract the oversprayed powder from the air within which it is drawn from the spray booth 3. This collected powder is then pumped by means of a conventional venturi pump 5 via a duct *5a* to the inlet of a sieve 6 or screen or other means for separating oversprayed powder from larger particles. In the illustrated embodiment, the oversprayed or reclaimed powder from the spray booth 3 is mixed with new powder from a fluidized makeup hopper 7 from which the makeup powder is pumped to the sieve by another venturi pump 8. As an alternative to the use of the makeup hopper 7, new powder may be simply dumped into the spray booth 3 and thereby the makeup hopper eliminated. A motor *6a* of the sieve is operative to turn sieve blades which cause the powder to be sifted through a mesh screen *6b* and dropped from the bottom or outlet 9 of the sieve into a feed hopper or primary hopper 14. As explained more fully hereinafter, the primary hopper is operative to supply the reclaimed powder either with or without the addition of new makeup powder from the makeup hopper 7 or from the booth 3 to an auxiliary hopper 16 from whence the powder is pumped to the guns 12.

A primary pneumatic pump 18 is operative to pump powder from the primary hopper 14 to the auxiliary hopper 16, and a plurality of auxiliary pneumatic pumps 20 pump powder from the auxiliary hopper 17 to the guns 12. The pneumatic pumps 18 and 20 are conventional venturi powder pumps which per se form no part of the invention of this application. One such pump which is suitable for use in this application is illustrated and described in U.S. Pat. No. 3,746,254 of Lane S. Duncan, et al., for "Powder Spray System," assigned to the assignee of this application. Another, and a preferred pump, useful in this system is illustrated and described in my co-pending patent application Ser. No. 660,388, filed Oct. 12, 1984 and entitled "Improved Venturi Powder Pump," also assigned to the assignee of this application.

The hoppers 14 and 16, as well as the makeup hopper 7, are also conventional fluidizing bed hoppers and per se form no part of the invention of this application. All of these hoppers 14, 16 and 7 have an enclosed chamber 24 in the base of the hopper and an air pervious ceiling 26 in the chamber. When high pressure air is admitted into the inlet 28 of the chambers 24, such air passes through the ceiling 26 of the closed chamber 24 and is operative to fluidize powder 30 contained in the hopper above the closed chamber 24.

The primary and auxiliary hoppers 14, 16 differ only in that the auxiliary hopper is much smaller in size and capacity than is the supply hopper 14. In one preferred embodiment wherein the auxiliary hopper 16 supplies powder to eight guns 12, the auxiliary hopper 16 has a volume equal to approximately 1/16th the volume of the supply hopper 14.

The two hoppers 14 and 16 both have a vent 34 in their top walls. Preferably, these vents are connected back to the interior of the spray booth 3 so that any powder escaping through the vents 34 does not enter the atmosphere. The auxiliary hopper 16 is connected to the primary hopper 14 via an overflow tube 36 which extends from the interior of the auxiliary hopper 16 downwardly through the closed chamber 24 of the hopper 16 and through the top wall 38 of the supply hopper 14. As explained more fully hereinafter, this overflow tube 36 functions to transport all excess powder from the auxiliary hopper 16 back to the supply hopper. It also functions to maintain a fixed level of fluidized powder within the auxiliary hopper 16.

The powder pumps 18 and 20 are substantially identical except that the powder pumps 20 of the auxiliary hopper are of smaller capacity than the primary pump 18 of the supply hopper 14. Each of these powder pumps has an inlet port 40, an outlet port 42, and an atomizing air inlet port 44, although the atomizing air inlet port 44 of the primary pump may be omitted or plugged. The primary function of the atomizing air flow to the pump is to even the flow rate and maintain a constant flow of powder from the pump. But, since the function of the primary pump is simply to supply powder from the primary hopper 14 to the auxiliary hopper 16 without any concern for constancy or evenness of flow, the atomizing air connection to the primary pump 18 may be omitted.

Each pump 18 and 20 has a powder flow passage 46 therein through which powder is drawn into a venturi pumping chamber 48 of the pump via a siphon tube 50 which connects the inlet 52 of the powder flow passage 46 to the fluidized bed 30 from which the pump draws powder. As an alternative to the use of the siphon tube 50 for connecting the inlet 52 of the primary pump 18 to the fluidized bed 30, the siphon tube may be omitted and the pump 18 mounted lower on the side wall of the hopper so that the inlet of the pump is located immediately above the air pervious plate or ceiling 26 of chamber 24. The supply hopper pump 18 functions to draw powder from the hopper 14 and pumps it into the auxiliary hopper 16 via a transfer conduit 54 while the auxiliary hopper pumps 20 draw powder from the auxiliary hopper 16 and pump it to the dispensing guns 12 via short transfer hoses 56.

The inlet ports 40 of the pumps 18, 20 are connected via air lines 58 to a source of high pressure air 60 while the atomizing air inlet ports 44 of the pumps are connected to the same high pressure air source via air lines 62. Internally of each pump there is a small air orifice through which the high pressure air from the source 60 flows into the venturi pumping chamber 48 so as to create a low pressure within that venturi pumping chamber. That low pressure is operative to draw powder via the siphon tubes 50 upwardly into the venturi pumping chambers 48 of the pumps such that the powder can then be transported via the hose 54 from the pump 18 to the hopper 16, or in the case of the pumps 20, via the hoses 56 to the dispensing guns 12.

As is explained more fully in the above-identified U.S. Pat. No. 3,746,254, or in my co-pending application Ser. No. 660,388, the pressure of air supplied to the port 40 controls the quantity of powder drawn upwardly through the siphon tube into the venturi pumping chamber 48 of the pump, and the pressure of air supplied to port 44 controls the ratio of air to powder mix within the pump. Typically, each of the air lines 58, 62 contains a pressure regulator (not shown) through which the air pressure supplied to the inlet ports 44 may be adjusted so as to control the amount of vacuum drawn within the venturi pumping chamber 48 of the pump and the relative air to powder mix supplied to the venturi chamber through the powder flow passage 46 of the pump.

In operation of the powder dispensing system 10, electrostatically charged powder is sprayed from the guns 12 onto a workpiece 2 conveyed through the powder spray booth 3 while suspended from hooks 1 of a conveyor (not shown). In practice, generally less than half of the powder sprayed from the guns is applied to the workpieces 2 being transported through the booth. The remainder or oversprayed powder becomes entrained within air within the booth, and while entrained in that air is withdrawn from the booth into a filter module 4. Within that filter module, the oversprayed powder is separated from the air within which it was entrained while transported from the booth. The oversprayed powder is collected in the filter module and is then pumped via a conventional venturi pump and while entrained in an air stream to the inlet of the sieve 6. Within the sieve, the oversprayed or reclaimed powder is passed through a mesh screen into a feed or primary hopper 14. The reclaimed powder may be mixed with new or makeup powder from a fluidized makeup hopper 7 within the sieve 6. Alternatively, new or makeup powder may simply be dumped into the bottom of the booth and mixed with the reclaimed or oversprayed powder within the filter module 4.

The powder contained within the primary or feed hopper 14 is fluidized therein and pumped to the auxiliary hopper. Within the auxiliary hopper, the powder is again fluidized and pumped to the guns.

In order to fluidize the powder within the primary or feed hopper 14 and the auxiliary hopper 16, high pressure air is supplied to the inlet ports 28 of the hoppers 14, 16. This high pressure air is operative to fluidize all of the powder 30 contained in the supply hopper 14 and the auxiliary hopper 16. The fluidized powder 30 in the supply hopper 14 is drawn via the siphon tube 50 upwardly into the venturi pumping chamber 48 of the pump 18. This powder is then transported from the supply hopper pump 18 via the relatively long transfer hose 54 to the powder inlet 68 of the auxiliary hopper 16. The fluidized powder in the auxiliary hopper 16 is in turn pumped by the auxiliary pump 20 to the dispenser guns 12 via the relatively short hoses 56. In practice, an excess quantity of powder is pumped from the primary or supply hopper 14 to the auxiliary hopper 16, which excess is greater than the capacity of all of the pumps 20. As a result, excess fluidized powder flows through the inlet 70 of the overflow tube 36 back to the supply hopper 14. The level of powder within the auxiliary hopper 16 is thus always maintained at a fixed level, that of the top edge of the inlet 70 of the overflow tube.

A powder pump 72 may be associated with the overflow line 36 in the event that gravity is insufficient to carry the overflow powder to the primary hopper. Such a pump may be required in installations where there is substantial distance between the two hoppers or where the primary hopper is not located beneath the auxiliary hopper.

Prior to this invention, it has been the practice to pump powder directly from the supply or primary hopper 14 to the guns 12 as disclosed, for example, in U.S. Pat. No. 3,870,375. There was no intermediate or auxiliary hopper 16 in the system. I have found that the long hoses which hereto extended from the supply hopper 18 to the guns, as well as the constantly changing level of powder within the supply hopper 14, both contributed to and created a problem of varying powder flow from the guns. Specifically, I have found that a long hose extending from the pump of the supply hopper to the gun had numerous curved or looped sections wherein powder collected and tended to restrict flow through the long hose. This restricted flow in turn caused a pressure drop in the hose to the gun with a resultant drop in the quantity of powder being pumped from the supply hopper to the gun. Periodically through, the pressure behind the powder created restriction built up to the point that it caused the restriction to break, thereby causing a high density puff of powder to be dispensed from the gun. This in turn resulted in a temporary increase in the flow of air and powder from the pump to the gun because of the sudden increase in air flow through the hose. Then the restriction would again build up in the hose at the same point at which it had just broken free and the process was repeated.

I have found that by utilizing the auxiliary hopper 16 between the supply hopper and the guns, and preferably close to the guns, the erratic powder flow from the guns created by these powder-created restrictions in the hose are minimized or substantially eliminated. I have also found that the use of the auxiliary hopper 16 assists in maintaining an even flow of powder from the guns 12 by maintaining a fixed level of powder in the hopper from which powder is supplied to the guns 12. The level of powder in the supply hopper is subject to change, and that change, prior to this invention, causes changes in the powder flow from the guns 12. These changing powder flows were the result of the changing air pressure required to draw powder from the fluidized bed of powder into the venturi pumping chamber 48 of the pump. As the level of powder in the fluidized bed is lowered, a greater vacuum is required to pull powder from that bed into the venturi chamber, or as the level is raised, a less vacuum is required. But, the vacuum in the venturi pumping chamber of the pump does not change with changing levels of powder in the fluidized bed. Instead, the powder flow from the pump varies. By utilizing the invention of this application, with the fixed level of powder in the auxiliary hopper, this source of varying powder flow from the gun is eliminated.

While I have described only a single preferred embodiment of my invention, persons skilled in the art to which this invention pertains will appreciate numerous changes and modifications which may be made without departing from the spirit of my invention. Therefore, I do not intend to be limited except by the scope of the following appended claims:

I claim:

1. In combination, a powder spray booth, a powder spray gun for spraying solid particulate powder onto workpieces contained within said booth; a filter module for collecting oversprayed powder from said booth, and a sieve for receiving powder from said filter module and separating said oversprayed powder from coarser particles, a primary fluidized bed hopper for receiving powder from said sieve, said primary hopper having an interior chamber adapted to receive and fluidize powder material, a primary pneumatic powder pump having an inlet port and a discharge port, said primary powder pump having a low pressure venturi pumping chamber contained therein and a powder flow passage intersecting said venturi pumping chamber, said powder flow passage having an inlet connected via a siphon tube to said interior chamber of said primary hopper, means connecting said inlet port of said primary powder pump to a source of high pressure air, an auxiliary fluidized bed hopper having an interior chamber of substantially less capacity than said interior chamber of said primary hopper, said auxiliary fluidized bed hopper being located in close proximity to said powder spray booth, first conduit means connecting said outlet port of said primary powder pump to said interior chamber of said auxiliary hopper, at least one auxiliary pneumatic powder pump having an inlet port and a discharge port, said auxiliary powder pump having a low pressure venturi pumping chamber contained therein and a powder flow passage intersecting said venturi pumping chamber, said powder flow passage of said auxiliary powder pump having an inlet connected via a siphon tube to said interior chamber of said auxiliary hopper, second conduit means connecting said outlet port of said auxiliary powder pump to said powder spray gun, said second conduit means being substantially shorter than said first conduit means, and means for maintaining a constant level of fluidized powder in said auxiliary hopper, said means for maintaining a constant level of fluidized powder in said auxiliary hopper comprising an overflow tube extending between said auxiliary hopper and said primary hopper, said overflow tube having an inlet spaced upwardly from the bottom of said interior chamber of said auxiliary hopper.

2. The apparatus of claim 1 which further comprises a plurality of auxiliary powder pumps and a plurality of powder spray guns, each of said auxiliary powder pumps having a powder flow passage connected via a siphon tube to the interior chamber of said auxiliary hopper, and each of said auxiliary powder pumps having an outlet port connected via conduit means to one of said powder spray guns.

3. In combination, a powder spray booth, a powder spray gun for spraying solid particulate powder onto workpieces contained within said booth; a filter module for collecting oversprayed powder from said booth, and a sieve for receiving oversprayed powder from said filter module and separating said oversprayed powder from coarser particles, apparatus for dispensing a relatively constant flow of solid particulate powder from said powder spray gun, which apparatus comprises, means including a relatively large capacity primary hopper for receiving powder from said sieve and for fluidizing said solid particulate powder, a substantially smaller capacity auxiliary hopper, means including a relatively long conduit for supplying said powder from said primary hopper into said auxiliary hopper, means for fluidizing said powder in said auxiliary hopper, means including a relatively short conduit for supplying said solid particulate material from said auxiliary hopper to said powder spray gun, said means for supplying said powder from said primary hopper to said auxiliary hopper being operable to supply a greater quantity of solid particulate powder material to said auxiliary hopper than is supplied from said auxiliary hopper to said spray gun, and means for transporting excess powder from said auxiliary hopper to said primary hopper so as to maintain a substantially constant level of fluidized powder in sad auxiliary hopper.

4. In combination, a powder spray booth, a powder spray gun for spraying solid particulate powder onto workpieces contained within said booth; a filter module for collecting oversprayed powder from said booth, a primary fluidized bed hopper for receiving powder from said filter module, said primary hopper having an interior chamber adapted to receive and fluidize powder material, a primary pneumatic powder pump having an inlet port and a discharge port, said primary powder pump having a low pressure venturi pumping chamber contained therein and a powder flow passage intersecting said venturi pumping chamber, said powder flow passage having an inlet connected to said interior chamber of said primary hopper, means connecting said inlet port of said primary powder pump to a source of high pressure air, an auxiliary fluidized bed hopper having an interior chamber of substantially less capacity than said interior chamber of said primary hopper, first conduit means connecting said outlet port of said primary powder pump to said interior chamber of said auxiliary hopper, at least one auxiliary pneumatic powder pump having an inlet port and a discharge port, said auxiliary powder pump having a low pressure venturi pumping chamber contained therein and a powder flow passage intersecting said venturi pumping chamber, said powder flow passage of said auxiliary powder pump having an inlet connected to said interior chamber of said auxiliary hopper, second conduit means connecting said outlet port of said auxiliary powder pump to said powder spray gun, said second conduit means being substantially shorter than said first conduit means, and means for maintaining a constant level of fluidized powder in said auxiliary hopper, said means for maintaining a constant level of fluidized powder in said auxiliary hopper comprising an overflow tube extending between said auxiliary hopper and said primary hopper, said overflow tube having an inlet spaced upwardly from the bottom of said interior chamber of said auxiliary hopper.

5. The apparatus of claim 4 which further comprises a plurality of auxiliary powder pumps and a plurality of powder spray guns, each of said auxiliary powder pumps having a powder flow passage connected to the interior chamber of said auxiliary hopper, and each of said auxiliary powder pumps having an outlet port connected via conduit means to one of said powder spray guns.

6. In combination, a powder spray booth, a powder spray gun for spraying solid particulate powder onto workpieces contained within said booth; a filter module for collecting oversprayed powder from said booth, apparatus for dispensing a relatively constant flow of solid particulate powder from said powder spray gun, which apparatus comprises, means including a relatively large capacity primary hopper for receiving powder from said filter module and for fluidizing said solid particulate powder, a substantially smaller capacity auxiliary hopper, means including a pump and a relatively long conduit for supplying said powder from said primary hopper into said auxiliary hopper, means for fluidizing said powder in said auxiliary hopper, means including a pump and a relatively short conduit for supplying said solid particulate material from said auxiliary hopper to said powder spray gun, said means for supplying said powder from said primary hopper to said auxiliary hopper being operable to supply a greater quantity of solid particulate powder material to said auxiliary hopper than is supplied from said auxiliary hopper to said spray gun, and means for transporting excess powder from said auxiliary hopper to said primary hopper so as to maintain a substantially constant level of fluidized powder in said auxiliary hopper.

* * * * *